United States Patent [19]

Law

[11] Patent Number: 4,861,684
[45] Date of Patent: Aug. 29, 1989

[54] ELECTRICAL SAFETY SYSTEM FOR BATTERIES

[76] Inventor: Dwight D. Law, Rte. 1, Box 55, Petersburg, W. Va. 23804

[21] Appl. No.: 222,022

[22] Filed: Jul. 21, 1988

[51] Int. Cl.$^4$ .......................... H01M 2/20; H01M 2/34
[52] U.S. Cl. ........................................ 429/7; 429/121; 429/150; 429/160
[58] Field of Search ................... 429/7, 121, 150, 160

[56] References Cited

FOREIGN PATENT DOCUMENTS

| 2319412 | 11/1973 | Fed. Rep. of Germany | 429/121 |
| 2335267 | 1/1974 | Fed. Rep. of Germany | 429/7 |
| 0829979 | 5/1981 | U.S.S.R. | 429/121 |

Primary Examiner—Donald L. Walton
Attorney, Agent, or Firm—Walter G. Finch

[57] ABSTRACT

In this invention for totally eliminating the fire and/or electrical hazards associated with maintaining batteries for both automobiles and aircraft use, a weighted disconnect link is connected to an internal battery cell jumper. This link is arranged to bridge the center two cells of the battery by positioning the weighted link into the spring clips of the cell bridge lugs, thus completing the circuit within the battery. The section of the battery that houses the weighted link will be totally isolated from the electrolyte and explosive gas. An access door is provided in the battery for contact cleaning and maintenance if it should be necessary. This door provides a means to re-engage the link manually after it has been tripped by adequate G force. The G force is the key to the functioning of the system. When a sudden force is applied to the battery (a force strong enough to cause structural damage to the vehicle in which the battery is installed), the weighted link will displace itself, removing all electrical potential from the battery terminals and attached wiring. The link will tend to disengage the instant an adequate force is applied, and since only a very short distance is required to effectively open the internal circuit, all power will be removed from the terminals and the wiring before the frame becomes distorted to the extent necessary to cause major structural damage, shorting of high amperage electrical wiring and possible subsequent fire.

17 Claims, 6 Drawing Sheets

ELECTRICAL SAFETY SYSTEM FOR BATTERIES

BACKGROUND AND SUMMARY OF THE INVENTION

This invention relates generally to automotive and aircraft system batteries, and more particularly to devices for rendering battery safety in emergency situations, accidents and collisions.

Electrical disconnects and battery solenoids are normally located at some distance from the battery. There is an inherent problem with high amperage electrical wiring that can not be deactivated in emergency situations. This configuration is typical of all production aircraft.

The automobile industry has never had provisions or arrangements to manually disconnect batteries from electrical systems associated therewith in time of emergency.

In many accidents, automotive and aviation, that would otherwise have been survivable, the system battery provided a source of ignition to fuels and oil causing fire and unnecessary fatalities.

Another serious problem associated with this type of battery, is accidents during routine servicing, installation, and removal.

Proper procedures can eliminate most of these hazards, but because of exposed high amperage terminals and explosive gas within the battery thousands of accidents involving equipment damage, serious electrical and chemical burns, blindness, and even death have occurred because of inadvertent shorting of the high amperage battery terminals.

This invention when incorporated into all basic production batteries will totally eliminate the hazard associated with maintaining these batteries. Even more importantly, it will eliminate all possibilities of electrically induced fire, loss of equipment and life, in what might otherwise have been a survivable accident.

The basic concept of this invention is the addition of a weighted disconnect link to an internal battery cell jumper. This link bridges the center of two cells of the battery by positioning the weighted link into spring clips of the cell bridge lugs, thus completing the circuit within the battery.

The section of the battery that houses the weighted link will be totally isolated from the electrolyte and explosive gas.

An access door will be provided for contact cleaning and maintenance if it should become necessary. This door would also provide a means to re-engage the link manually after it has been tripped by adequate G force.

The G force just mentioned is the key to the function of the system. When a sudden force is applied to the battery (a force strong enough to cause structural damage to the vehicle in which the battery is installed) the weighted link will displace itself, removing all electrical potential from the battery terminals and attached wiring.

Since the link will tend to disengage the instant an adequate force is applied, and since only a very short distance is required to effectively open the internal circuit, all power will be removed from the terminals and the aircraft wiring before the airframe becomes distorted to the extent necessary to cause major structural damage, shorting of high amperage electrical wiring and possible subsequent fire.

On aircraft installations, the weighted link will be displaced when the required G force is applied from any direction. On automobiles, on the other hand, the displacement of the link would occur only when an adequate force is applied from any horizontal direction. This precludes link displacement because of suspension bottoming on rough roads.

To address the problems and hazards of routine service, a very simple solution has been provided which will totally eliminate the problem of fire and explosion.

The top of the battery will be provided with a hard plastic insulated plunger. This plunger will be equipped with an electrical contact at its base that will complete the batteries internal circuit when depressed. When lifted, it will open the internal circuit, removing all electric potential from the battery terminal, thus providing total safety during servicing installations and electrical cable attachments and disconnections.

This circuit can also be opened providing a safer means of storing the batteries. During vehicle maintenance, this plunger can, when lifted, disconnect all electrical power to the vehicle, thus eliminating the need to disconnect battery terminals and thus simplifying maintenance of equipment.

There is a great problem in transportation today relating to safety and specifically addressing the problem as fire during and after crashes of aircraft, automotive vehicles, trucks, trains, explosives or anything to do with sources of ignition during the transportation process. The problems do exist to a great extent, particularly within mechanical equipment. These problems being that they are complex with several different systems trying to co-exist in one single vehicle.

For instance, fuel systems and electrical systems are inherently dangerous to have together. The electrical systems of vehicles and airplanes provide a source of ignition to fuel which is spilt during crashes or lines which are broken or pumps that start to leak. But more importantly during survivable accidents in vehicles and aircraft, the source of ignition being that of the electrical system of that vehicle. In many, many cases provide the source of ignition which otherwise would not be there and consequently many people lose their lives while they are still in a vehicle, unconscious, or suffering trauma disorientation trying to remove the seat belt when they are hopelessly trapped in the vehicle and burn as a consequence of the problem of ignition to the fuel system that powered the vehicles.

The problem or problems of explosions or fires that set off fuel is considerable. The government in conjunction with test laboratories have developed to some extent and reduced the possibility of intermixing of electrical systems and spilled fuel during accidents.

In the aviation industry, there has been millions of dollars spent to provide special fittings, such that as the fitting is pulled loose during an accident, the maximum amount of fuel would be eight (8) ounces. There has been a large amount of money put into self-sealing fuel bladders and crash fuel bladders and that is about the extent other than location and design consideration as far as proximity of electrical wiring and fuel lines.

The current state of the art of the situation of crash warranty fuel systems and electrical systems needs much attention.

Basically, that is all that has been done by industry. Work has been done on jellied fuel, but it has been found that the expense involved is great and they way that the fuel can be manipulated is not adequate to really solve the problem of post-crash fires in aircraft. In automobiles, very little, if anything, has been done as far as equipment introduced to these vehicles. Design considerations is the major key. A fuel tank will be located in an area that is not as likely to rupture because of a rear-end accidents. Electrical wiring has been run within plastic sheets conduits. This is about all that has been done there.

The emergencies that are being addressed here are impact emergencies, post-crash fires in aircraft and just general collision accidents in automobiles that could be survivable. The impacts are substantial to the point which could cause structural damage in the aircraft or the automobile bad enough to degrade the air-worthiness of an aircraft or the safety of an automobile concerning the fuel in the ignition system, mixing and causing a fire.

So, normally in these types of accidents it would be fine to prepare for, especially in automotive accidents. Probably the best thing is to eliminate totally that ignition source which is the charging system of the vehicle and the battery terminals themselves. In light of this, the system that has been developed will eliminate the problem at its source immediately upon impact before the fuel spills.

This invention is not limited to impact type of emergencies because there is no manual disconnect on the top of the battery which allows for the internal circuit of the battery to be disconnected at any time the mechanic or service operator wishes to do this. When the mechanic or service operator is repairing the car, it is a good practice to remove the battery terminals when the operator is working under the hood of an automobile because those terminals exposed on the top of the battery can cause severe burns, sparks and the battery can blow-up in your face.

With marine vessels, of course, the crash worthiness of the system would function basically the same as the automotive or the aviation. The G-disconnect link within the battery could be tailored to control the system. In marine vehicles, there are fumes that tend to accumulate in the holds of these vessels and when there is fuel stored and fumes, it is very important to keep any ignition source away from those vapors. With the ICED battery and its design whenever maintenance is being done on that vehicle, this battery that is disclosed here, has a manual disconnect plunger located on the top so that it could be depressed within and the contact would be broken within the battery, thus eliminating any possibility from that point throughout the maintenance process of having an electrical arc which could ignite fumes or fuels during maintenance.

Aircraft, automotive and marine can all utilize the invention. In certain situations where vehicles within the industrial complexes, storerooms have an electrical system on them installed in those vehicles. If an accident were to happen, it would eliminate the possibility of ignition sources because of the degraded electrical systems and thus prevent what could be maybe a catastrophic accident. With respect to nuclear power, those vehicles which operate close to nuclear power stations. Anywhere that current lead-acid batteries are being used or any battery for that matter, that is used in vehicles or in industrial equipment, that is involved in motion, this battery could be applied to that equipment in making it that much safer. That much safer actually equates to total safety when the problems are associated with electrical sparks after an accident. Nickel batteries are used in large quantity other than lead-acid batteries.

The present invention can apply to any battery ignition system, even up through the fuel cell type batteries. The lead-acid battery is the most commonly used battery system which is currently being used in the automotive and general aviation industries. Then, nickel cadmium batteries which are used in some of the larger jet aircraft or business jet aircraft, helicopter applications, but as far as the design, the invention can be applied to any of those types of systems for batteries.

The invention of the present battery system is applied to transportation or industry, any possibility of a fire resulting from that vehicle causing a source of ignition to the fuel. A fire resulting from an explosion or vice versa depending how large the quantity of fuel and the type of fuel. But by eliminating this one ignition source effectively, then certainly lives will be saved, together with equipment and money.

The invention is extremely simple in operation, very economical, very easy to manufacture, with very little modification actually required to the standard battery as it exists today. So, in its simplicity, it would also be very low cost. It could have a total application. It would replace those batteries which are in production as far as dimension and size, one-to-one. If someone wanted to put this system in their automobile today, all he would need to do is make a switch. When this battery is installed, there is no other modifications required to that vehicle to benefit from the system.

The maintenance on this battery would be identical to maintenance on any other currently available battery. In addition, there might be some maintenance required as far as contact cleaning and there of course, is access to this modified area of the battery which would give you access to reset the battery after it was triggered to open and to clean contacts or make small adjustments. But, with the application of a patented compound to the contact area, which house the circuit disc connector, maintenance should be relatively not needed for the most part.

The manual disconnect of the invention on the top of the battery would allow for an immediate means of disconnecting electric circuit to the automobile. If, for instance, by turning the key off in a car when it is noticed that smoke is coming out from under the hood, that does not necessary shut all the parts.

It would be, of course, very easy to add equipment to a vehicle to make that disconnecting by means of an inside control to be able to completely disconnect this battery from inside of a vehicle also. Of course, there would be equipment needed for that, but there again that could come later when the battery is put into service, then those supporting pieces of equipment may of course be added, so you would have a manual means of disconnecting the battery from inside the vehicle.

The purpose of this invention is to provide, of course, safety. This battery when put in place, enhances the safety of all vehicles which it can be installed in. But, the main advantages of the invention are simplicity, cost effectiveness—it will be easy to manufacture, the market already exists in industry. No market has to be established for this piece of equipment. It deals with safety and important for safety in transportation in this country.

It is an object of this invention to provide a system and/or systems for manually disconnecting batteries from electrical systems associated therewith in time of emergency, such as collisions and accidents.

Another object of this invention is to provide a system which will disconnect all electrical power of an automotive vehicle and/or aircraft engine in time of emergency, thus eliminating the need to disconnect battery terminals and thus simplifying maintenance of equipment.

Another object of this invention is to provide a safety system for engines of various type, including automotive, aircraft, and marine which will eliminate and/or minimize fire and/or explosives in such apparatus.

Another object of this invention is to provide various safety systems to use with batteries of all types in connection with multiple type engines to minimize explosions and fires, thus saving thousands of lives.

BRIEF DESCRIPTION OF THE DRAWINGS

These and other attendant objects and advantages will become more apparent and obvious from the following detailed specification and drawings in which.

DESCRIPTION OF THE PREFERRED EMBODIMENTS

Figure 1:
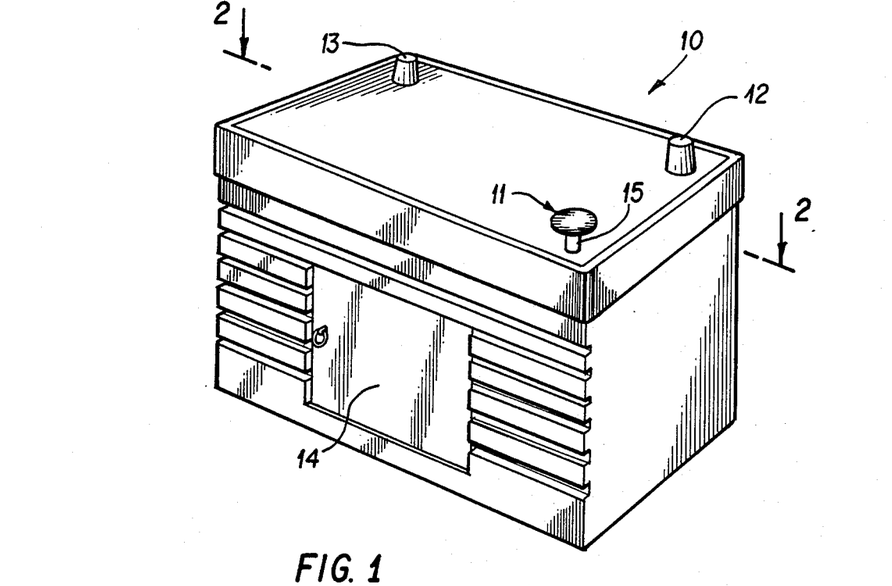
FIG. 1 is a perspective view of a battery incorporating features of this invention.

Referring now to the drawings, there is shown in FIG. 1, a battery 10, with two positive and negative terminals 12 and 13, respectively, and a manual plunger 11 connected by a plunger shaft 15 to the inside of the battery. The automotive lead-acid battery 10 is conventional. In addition, this battery 10 has a compartment or access door 14. The battery 10 is a depiction of a typical battery with two modifications consisting of the manual plunger 11 and the plunger shaft 15. The button on top of the plunger is used to manually disconnect the battery 10.

Figure 2:
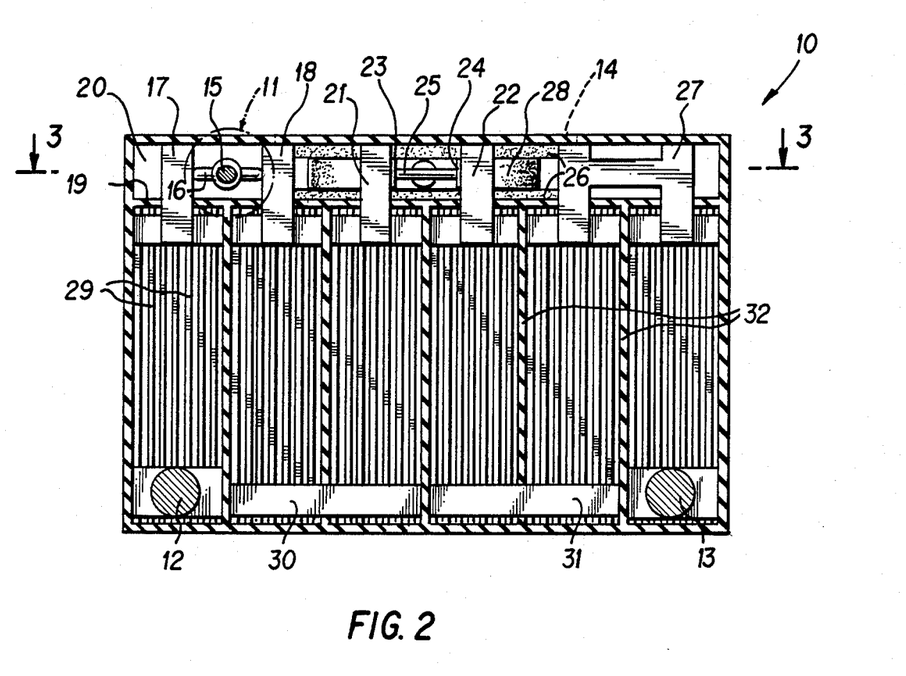
FIG. 2 is a sectional plan view of the battery taken along line 2—2 of FIG. 1.

FIG. 2 shows a top view of the modified ICED battery. ICED is the acronym used for internal circuit emergency disconnect.

Cell bridges 30 and 31 link the second, third, fourth, and fifth cells of this 12-volt battery 10 with two volts being produced at each cell within the battery 12, totaling 12-volts. Cell plates 29 are provided within each cell 90 with two of the cell plates 29 being depicted here. These cell plates are zinc-plates, with insulators between each one of them. The insulators are made out of any material that is non-conductive. An electrolyte is within the cavity of each 2-volt cell, separated by a wall. The cell dividers 32 are the insulating walls between each cell of the 12-volt battery 10. In the case of the battery 10, which is located next to the electrolyte area of the cells, isolates the electrolyte and the hydrogen and oxygen gas which are produced during charges and discharges of the battery 10.

On the other side of the inner wall 19 in a separate compartment 20, there are housed in compartment 20 the components that are the modification or the improvement to this lead-acid battery. A negative electric plate 17, a positive electric plate 18, a negative electric plate 21, a positive electric plate 22, and positive and negative electrodes 27, which are cell-bridges, have been modified to extend horizontally through the inner wall 19 rather than vertically and bridging rather than coming vertical and across and down to bridge the first two cells. They then extend horizontally toward the back wall of the battery 10 and instead of being permanently connected by soldered conductors within the electrolyte area, the negative and positive electrode plates, respectively depicted here, the circuit is completed between these two cell bridges by this contact link 16.

Looking down the top of the battery 10, it is seen that the contact link 16 will then bridge these two cells completing the circuit between the first two cells of this battery 10. The current flows to the cell bridge through the positive electrode 30 across and through this cell to the negative plate 21 of the cell bridge. The negative and positive plates 21 and 22 complete the circuit with contact link 25 which is attached to a weight 28. This weight 28 and contact link 25 make up a weighted disconnect link.

When the battery 10 is subjected to unnatural forces, the link will displace itself away from the negative and positive plates 21 and 22, respectively, and effectively eliminate the circuit caused by the connection of the link in taking all the current away from terminals 12 and 13 of the battery 10 in any direction that the battery 10 may get hit. This link will disconnect.

The positive and negative electrodes 27 are horizontal cell bridges which are permanently connected. All of these cell bridges are made identical on all six cells for simplicity of manufacture.

A manual plunger 11, which is shown by a dashed-line, which shows the presence of the manual disconnector to plunger shaft 15 and the contact link 16. By shoving down on this plunger shaft 15 the current capability of that link and the two cell bridges is removed.

Modified bridge cells 23 are the back wall of the battery 10 which then gives airspace in the compartment 20 to house the equipment necessary to disconnect the battery 10 internally. In order to house all the components within the case of the battery 10, a double wall is provided within the battery 10 to separate the chemical side to the equipment side of the battery 10.

A very low density film 26 gives the weight 28 a slight bit of support so that it does not tend to bang around within the case. Also, it would make the weight 28 less likely to oscillate. In the case of an automobile on rough roads, it would tend to dampen the swaying effect of this link as a precaution and to possibly preclude any chafing between the link and the case of the battery 10. Thus, the low density film 26 is a very mild support for the link so that it does not rattle.

Figure 3:
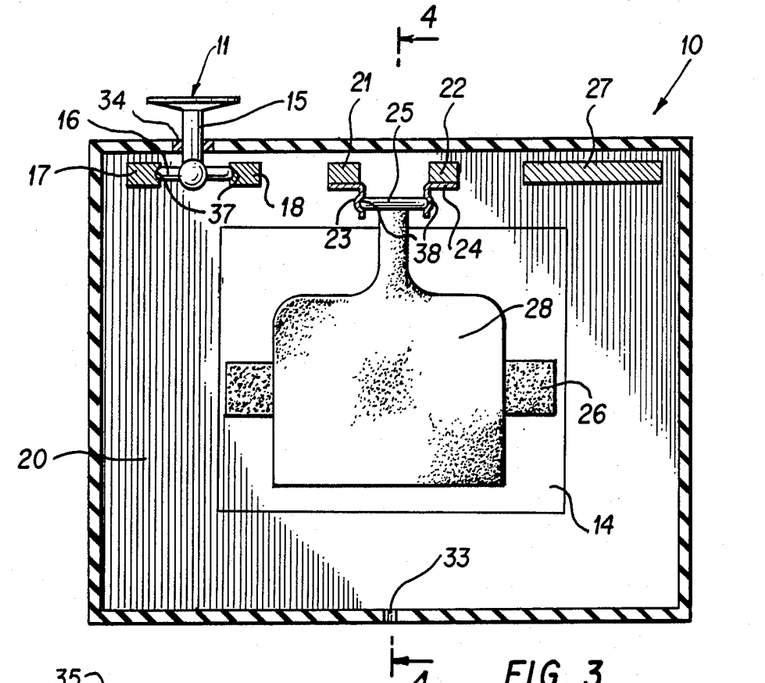
FIG. 3 is a sectional side view of a battery compartment taken along line 3—3 of FIG. 2.

FIG. 3 shows an end view or side view end of the battery 10 and the cell bridges and all components 27, 22, 21, 18 and 17 (these are all the same) which are the horizontally designed cell bridges, that is 17, 18, 21 and 22. The horizontal cell bridges 24 include the conductive area of the cell bridge 21 and 22 (negative and positive plates). The contact link 25 snaps into these bridge cells or contacts 24. A dimple 38 is provided within the cells 24. The dimple 38 is required to hold the link in position. A bridge cell 23 is provided which is a conductive clip and a bridge cell 24 is a conductive member.

A dimple 38 has a line coming up to it. A line comes over to the dimple and then through cell 23 and cell 24. The cells 23 and 24 are the dimpled clips. The link 25 is then retained within these two dimples 37 and 38 s that vibration will not tend to degrade its positioning. The weight 28 is a weight attached to the contact link 25.

The magnitude of the weight 28 would be dependant on the application of the battery 10. The weight 28 would be directly proportional then to the mass. Depending on the material that the weight 28 is made of, it could be adjusted to affect a disconnect at the two clips or bridge cells 23 and 24. It is appropriate for the equipment that it is to be installed in, and could be adjusted during manufacturing. The dimples 37 are two conductive clips as shown herein as the bridge cells 23 and 24 but of the smaller design probably a little more compact within cell bridges 18 and 17 or electrode plates. This allows a manual means of disconnecting the circuit internally within the cavity or compartment beyond the door 14.

By shoving down on plunger 11, the same effect is brought about as it could be for the weight 28 to be dislodged from its contact area by inertia force. The manual plunger 11 depicts the manual disconnector and the weight 28 is the weighted link disconnect. These can be used separately or together.

The horizontal cell electrodes 27 bridge the last two cells. These are permanently bridged together in this area. A vent 33 is provided since the case should be vented at the bottom to allow any moisture that may collect from condensation.

It needs to be understood though that the negative and positive plates 21 and 22, are the cell bridges contact link 25 and clips (bridge cells) 23 and 24 will be coated with a silicone material which will be dielectric in nature and anti-corrosive so that it will afford protection to the circuitry and the switching of these components which will reduce maintenance on them considerably. The negative and positive plates 10, of course, will be sealed from any acid or fumes of the battery 10 through this compartment 20 shown in FIG. 3, much like the top of the battery is sealed from electrolyte.

Figures 4, 5:
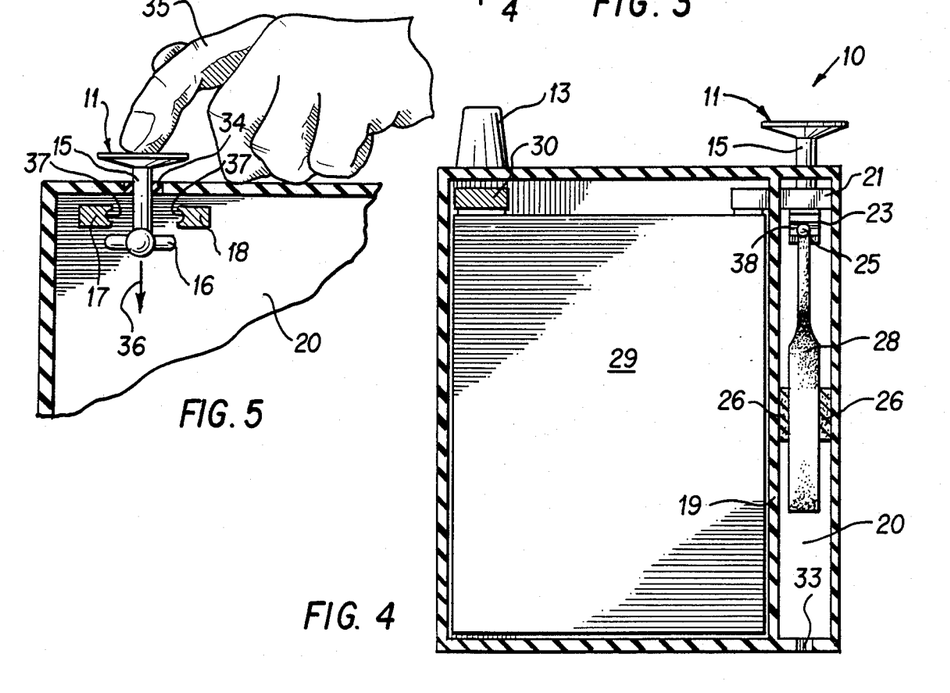
FIG. 4 is a sectional end view of a battery compartment taken along line 4—4 of FIG. 3.
FIG. 5 is a partial view of the battery, illustrating a manual plunger being disconnected.

FIG. 4 shows an end view of the battery 10, the compartment 20 is the cavity that houses the internal circuitry of the battery 10, including the weighted link 28, low density foam or sponge rubber 26 to hold this link in a passive position to keep it from rattling and chafing. The dimple 38 is shown in the end view of the dimple area of contact link 25. This link 25 is the conductive link itself which is exposed at this point. The ventilating aperture 33 is at the bottom of the cavity which is shown in FIG. 3. In the compartment 20, is the air space within the battery 10 that houses the internal disconnect circuitry.

The weight 28 is the weighted link as previously mentioned. It is to be noted that density foam or sponge rubber keeps the link from rattling. The inner wall 19 of the battery 10 separates the electrolyte and the gas from entering into the compartment 20. The contact link 25 is the conductive link which is attached to the weight 28 that bridges the gap between the cells 24 referring back to FIG. 3 and the cells 23 shown here to complete the internal circuit of the battery 10. The negative plate 21 is a modified horizontal cell bridge extending through the wall 19.

Referring now to FIG. 4, the top of course shows a negative post 13 which is a battery terminal. The electrodes are provided as existing cell bridge. The manual button connected to the plunger or plunger shaft 15.

In FIG. 5, there is shown the contact link 16 as it disconnects from the two cell bridges 17 and 18 in that it can be manually activated by pushing on it.

Figure 6:
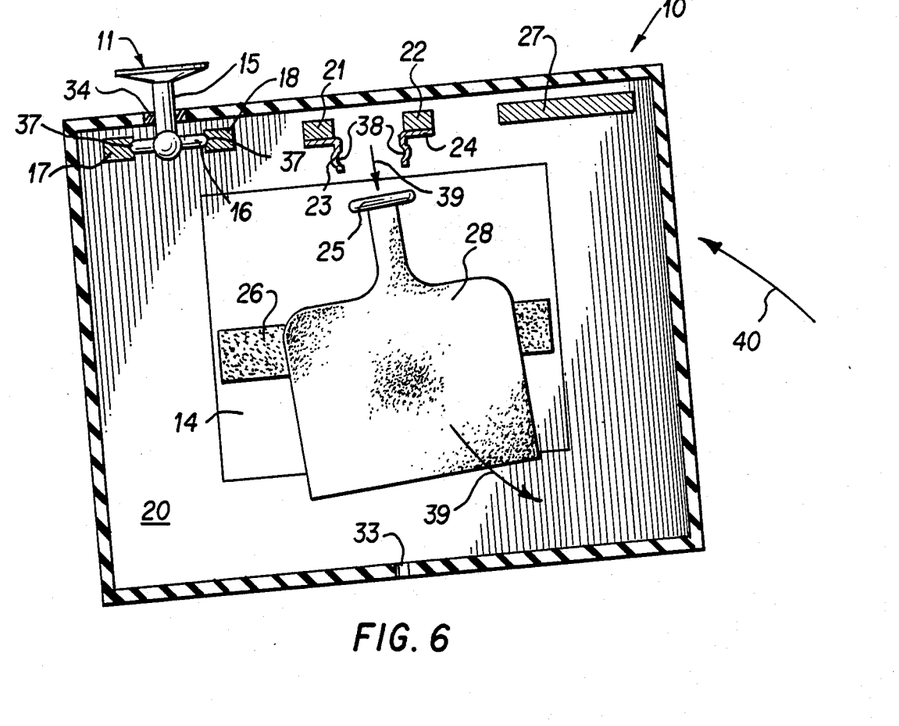
FIG. 6 is a sectional side view showing a "G" force connecting weight.

FIG. 6 shows an arrow 40 which is indicating that a force is being applied to the case of the battery 10. Arrow 39 shows a resultant moment in displacement of the weight 28 and the conductive link 25. At some point in the process of the crash before the conductive link 25 comes to rest, it is now suspended. It is disconnected between the two clips (bridge cells) 24 and 23, and snapped out of the dimples 38 of those two clips 23 and 24. The conductive link 25 is now not in any way serving as a conductor to the two cell bridges 21 and 22, thereby eliminating any possibility of the battery terminals potential for voltage. They are zero at this time. The sponge rubber 26 again shows the low density foam which before this time prevented the weight 28 from rattling but because it is such a low density foam it did not hinder the displacement of weight 28.

The arrow 40 shows the force to the battery. This force 40 could be from any direction, top, bottom, side or any combination of forces in sequence will disconnect the link from its positioning clips out of the dimples 38.

Figure 7:
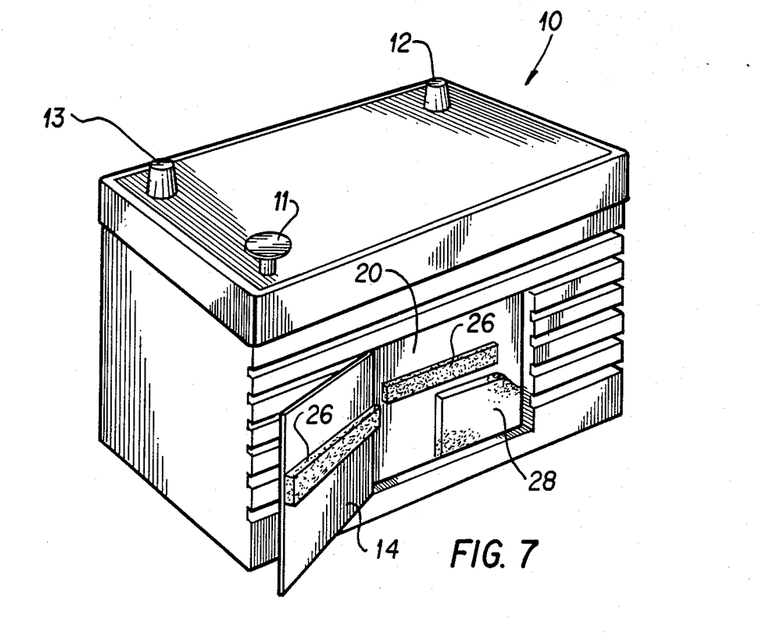
FIG. 7 is a perspective view of the battery showing an open compartment door.

FIG. 7 is the same as the battery depicted in FIG. 1 only access door 14 is opened to show the interior. Most of these batteries 10 are already charged and ready to go when you buy them on the shelf.

Figure 8:
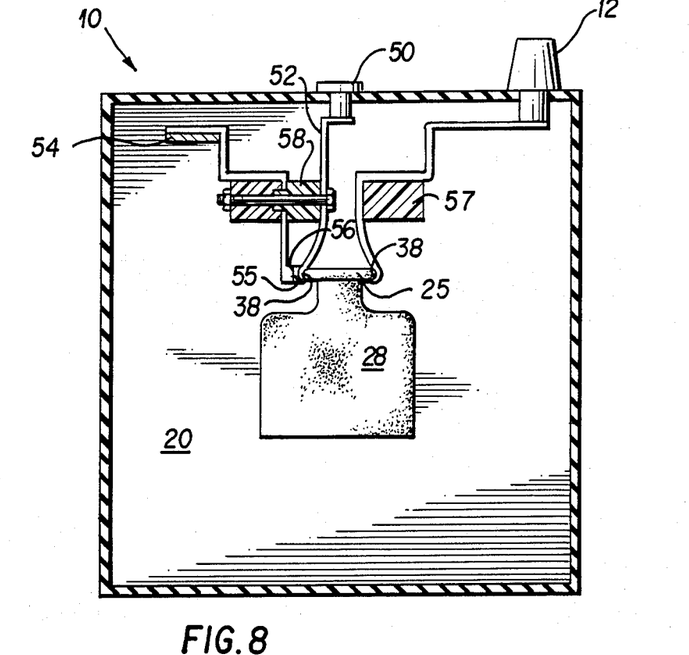
FIG. 8 is an end view of a second embodiment of a battery, partly in elevation, for removing battery and generated power.

FIG. 8 is a variation of the standard battery with a cell bridge 58 and a cell bridge 57 connected through a contact link 25. A third terminal 50 is provided on the top of the battery 10 and it is connected through a jumper strap 52 to a switch contact 56. When the contact link 25 is in position with the weighted link 28, the connecting link 25 is in position, the circuit is completed off of cell bridge modified in this case as depicted in the negative cell electrode through an insulated support on the inner case of the battery to a double contact switch which is closed when contact link 25 is in place.

Therefore, it completes a circuit between the components 54, 50 and 12, which is a battery terminal. All three are now with the link in place, and the battery 10 is in its normal state of operation. The battery terminal would be hooked of course to the positive post 12. The charging system of the vehicle would go instead of to positive post 12, as it normally would, it would go to post 50, which could be the output of the generator or alternator.

When the force is applied to the battery 10 during an accident, the weight 28 and contact link 25 will be displaced, opening the circuit between the dimpled areas here depicted by reference numeral 38 and the contacts at contact surfaces 56 and 55. It also opens the circuit at post 50, thereby removing all generated electrical power from the vehicle along with the stored energy within the battery, so that it completely disconnects all charging circuits and shuts down the alternator or generator and shuts off the terminals of the battery 10. The battery 10 is being used as shown in FIG. 8 as a means of removing all vehicle electrical current during an accident.

Figure 9:
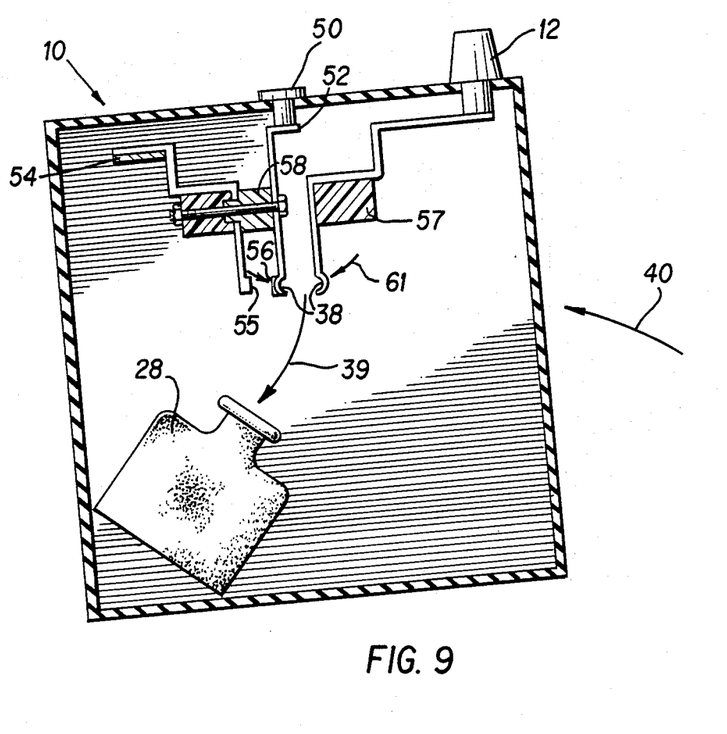
FIG. 9 is a view of the second embodiment of a battery for automotive or aircraft equipment, partly in elevation of a deflected weight.

Referring to FIG. 9, there is shown the battery again after a force 40 has been applied great enough to displace the contact link 25 which is attached to the weight 28. The path of displacement of the weight 28 is shown by the path of the arrow 39. The link 25 drops out of the bottom. A contact 55 which is now isolated is shown. A second contact 56 is also isolated, as well as a third contact 61 which is also isolated. The terminal 50 which is the third terminal of the battery 10 and terminal 12 have no capability of producing any current whatsoever. When the generator output lead is connected to terminal 50, then it is opened from its circuit at this point thereby eliminating any field voltage from going back to the alternator and thus shuts the alternator down.

Figure 11:
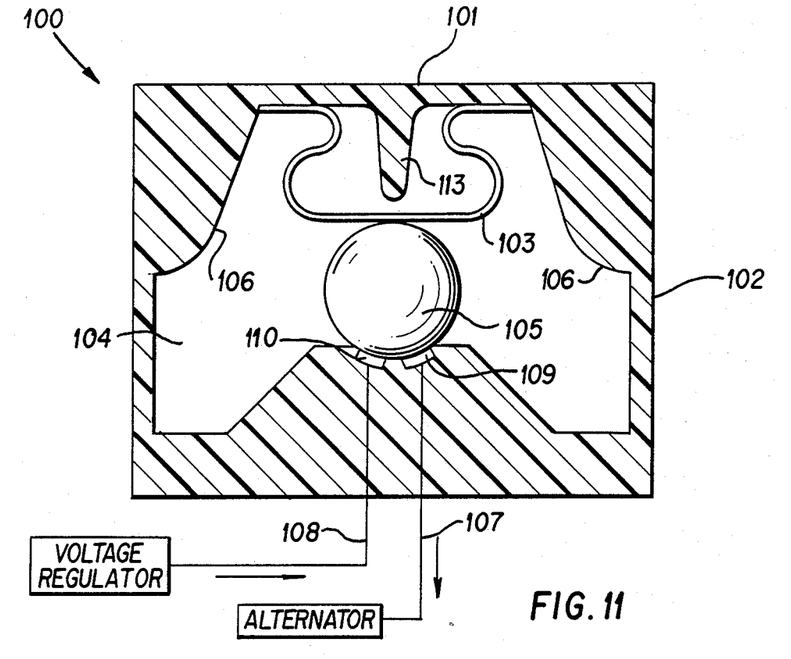
FIG. 11 is another embodiment of the invention showing a sectional view of a plastic housing having a steel ball positioned in operative position therein.

FIG. 11 shows a separate G-activated disconnecting switch which could be used in conjunction with the battery 10 on other components of vehicles such as alternators, generators. A plastic medium circular case 102, is provided with an air space 104 on the inside of it. A block is provided which has a G-activated disconnect switch which uses a conductive steel ball which is put into a pocket which contains contacts 110 and contacts 109. A spring 103 retains the ball 105 in its pocket. A deflector 106 shown in a few places here, they are deflector walls or pumpers like a pin-ball machine. When this system is in operation, current can flow through wires 107 and 108 to the contacts 109 and 110.

The current will not flow through the spring 103. The current merely flows through the ball 105 and acts as a conductor between these two contacts 109 and 110.

When an impact force shown by 111 is applied, the ball 105 tends to remain in motion or remain standing still and displaced out of its pocket, and thus opens the circuits at contacts 110 and 109.

The ball 105 moves in any direction off of its pedestal, and when it strikes deflector 106, the ball 105 is directed downwardly. The spring 103 now conforms to its unleaded position which keeps the ball 105 from the possibility of reconnecting during a tumbling accident or a series of impacts.

Pocket prevention pin 113 is provided in case there is an impact from directly above the pin 113 and would keep the spring 103 from forming a pocket and thus retain the ball 105 without it being displaced to either side in the likelihood that a direct blow would be felt about them. A top case 101 is provided.

Figure 12:
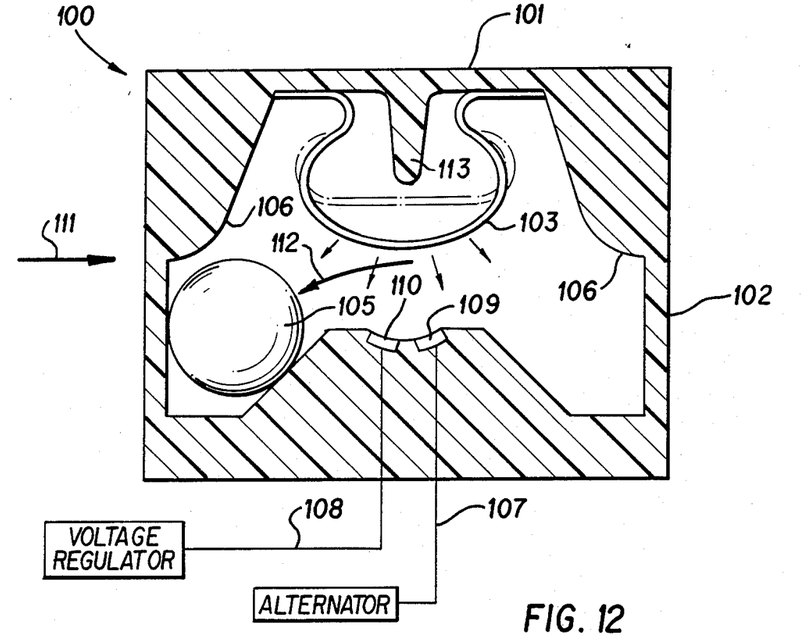
FIG. 12 is a sectional view of a plastic housing showing the displacement of the plastic ball.
Figure 13:
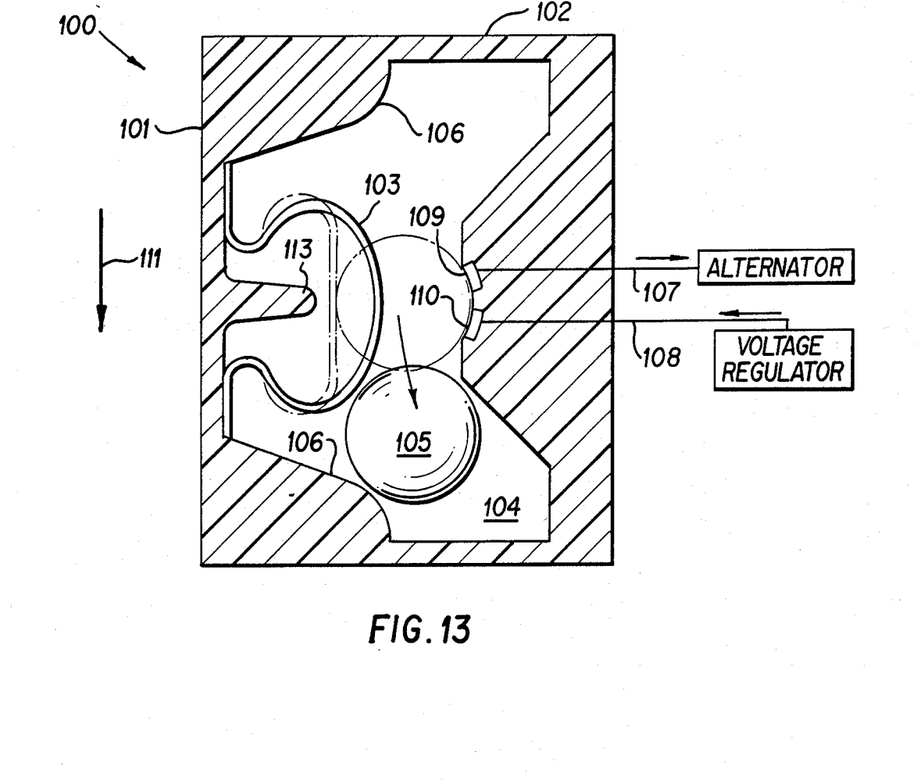
FIG. 13 is a sectional view of still another embodiment of the invention in a plastic housing for use in aviation equipment.

FIG. 13 shows the same device as described in FIG. 12 only in a horizontal position. This system would be more suitable to applications in aircraft which do not suffer as many accidents with horizontal impacts as they do vertical. The ball 105 would tend to dislodge out of its pocket opening the circuit. This drawing is basically put here to show that it can be mounted in any direction depending on the application of the invention. The invention of FIG. 12 would show its installation in an automobile, which would by all means not be effected by any impacts from directly underneath the vehicle. The invention of FIG. 13 would be more suitable to aircraft. The prevention pin 113 is a pin that prevents this spring from forming a pocket in retaining the ball 105. It ascertains that the ball 105 will in fact be deflected toward the deflector 106.

Figure 10:
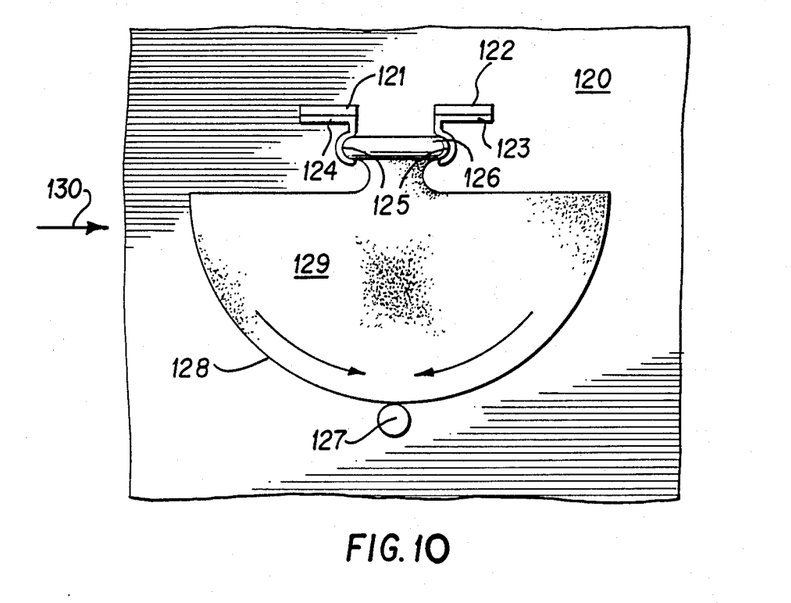
FIG. 10 is an embodiment of the invention showing the use of a semi-circular weight to disarm the battery.

FIG. 10 is a variation of the link in the battery 10, a weight 129 having a lip 126 engaged by the conductive steel clips 123 and 124. The only difference here is that the weight 129 is circular with the center of its circle being the center of the link. There is a problem of having a battery in a car and it becomes disconnected because of road bumps although road bumps, if they are hard enough to destroy the car, a road bump should certainly disconnect the link. The invention of FIG. 10 addresses that problem with a supporting pin 127. The mechanism is a circular disc-connect link that will disconnect in any direction other than by a force from the bottom, which is only here to address the question of what about a rough road. A positive electrode plate 121 is of course a horizontal cell bridge, while a negative electrode plate 122 is a horizontal cell bridge. Steel clips 123 and 124 are the conductive clips, and they are provided with a dimple 125 for the disconnect link.

As can be readily understood from the foregoing description of the invention, the various embodiments of the invention can be configured in different modes to provide a device for disconnecting electrical systems for automotive vehicles, aircraft, and marine vessels.

Accordingly, modifications and variations to which the invention is susceptible may be practiced without departing from the scope and intent of the appended claims.

What is claimed is:

1. A system for totally eliminating fire and/or electrical hazards associated with maintaining batteries for both automobiles and aircraft having a pair of spaced positive and negative terminals, a plunge, a shaft means in said battery connected to said plunger for manually opening the internal circuit of said battery, said battery having at least a pair of cells with a cell bridge lug means connected between said pair of cells, spring clip means connected to said cell bridge means, and a weighted disconnect link means bridging said pair of cells of said battery and coupled to said spring clip means.

2. A system for totally eliminating fire and/or electrical hazards associated with maintaining batteries for both automobiles and aircraft as recited in claim 1, and additionally said weighted disconnect link means being totally isolated from the electrolyte and explosive gas.

3. A system for totally eliminating fire and/or electrical hazards associated with maintaining batteries for both automobiles and aircraft as recited in claim 1, wherein said weighted disconnect link means being isolated from the electrolyte and explosive gas.

4. A system for totally eliminating fire and/or electrical hazards associated with maintaining batteries for both automobiles and aircraft as recited in claim 3, and door means for access to the interior of said battery.

5. A system for totally eliminating fire and/or electrical hazards associated with maintaining batteries for both automobiles and aircraft as recited in claim 1, wherein said battery has a plurality of pairs of cells, with cell bridge means connected between said respective pairs of cells, engaging means connected to said cell bridge means, and a weighted disconnect means bridging a respective pair of cells of said battery and coupled to said engaging means.

6. A system for totally eliminating fire and/or electrical hazards associated with maintaining batteries for both automobiles and aircraft as recited in claim 5, said battery having a plurality of cells, said weighted disconnect means being totally isolated from the electrolyte and explosive gas of said battery.

7. A system for totally eliminating fire and/or electrical hazards associated with maintaining batteries for both automobiles and aircraft as recited in claim 6, wherein said battery has an access port for an entrance to the interior of said battery.

8. A system for totally eliminating fire and/or electrical hazards associated with maintaining batteries for both automobiles and aircraft as recited in claim 6, wherein said battery has a pair of spaced terminals.

9. A system for totally eliminating fire and/or electrical hazards associated with maintaining batteries for both automobiles and aircraft as recited in claim 6, and said shaft means in said battery operate in unison to manually open the internal circuit of said battery.

10. A system for minimizing fire and/or electrical hazards associated with power plants for both automobiles and aircraft, comprising, a pair of spaced positive and negative terminals, a plunger, a shaft means in said power plant connected to said plunger for manually opening the internal circuit of said power plant, said battery having a pair of cells with bridge means therebetween, spring means connected to said bridge means, and a weight means bridging the said pair of cells of said power means and coupled to said spring means.

11. A system for minimizing fire and/or electrical hazards associated with power plants for both automobiles and aircraft as recited in claim 10, and additionally said weight means being totally isolated from the electrolyte and explosive gas of said power plant.

12. A system for minimizing fire and/or electrical hazards associated with power plants for both automobiles and aircraft, comprising, a pair of spaced positive and negative terminals connected to said power plant, plunger means, means in said power plant connected to said plunger means for opening the circuit of said power plant, a pair of cells in said power plant, a bridge means therebetween said pair of cells, spring means connected to said bridge means, and a weighted means bridging said pair of cells of said power plant and coupled to said spring means, said weighted means being totally isolated from the electrolyte and explosive gas of said power plant.

13. A system for totally minimizing fire and/or electrical hazards associated with maintaining power plant for both automobiles and aircraft, comprising, a power plant having at least a pair of cells with bridge means therebetween, plunger means, means in said power plant connected to said plunger means for opening the circuit of said power plant engaging means connected to said bridge means, and a weighted disconnect means bridging the said pair of cells of said power plant and coupling to said engaging means.

14. A system for totally minimizing fire and/or electrical hazards associated with maintaining power plants for both automobiles and aircraft as recited in claim 13, said weighted disconnect means being totally isolated from the electrolyte and explosive gas of said power plant.

15. A system for totally eliminating fire and/or electrical hazards associated with power plants for both automobiles and aircraft as recited in claim 14, and additionally an entrance door means to the interior of said power plant.

16. A system for totally minimizing fire and/or electrical hazards associated with power plants for both automobiles and aircraft as recited in claim 14, wherein said power plant has a pair of spaced terminals.

17. A system for totally minimizing fire and/or electrical hazards associated with maintaining power plants for both automobiles and aircraft as recited in claim 14, said plunger, and means includes a plunger said means in said power plant connected to said plunger means includes a shaft wherein the internal circuit of said power plant can be manually opened.

* * * * *